(12) United States Patent
Schlesser et al.

(10) Patent No.: US 8,187,064 B2
(45) Date of Patent: May 29, 2012

(54) COMBINE CHOPPER WITH OVERLOAD PROTECTION

(75) Inventors: Benjamin J. Schlesser, Bettendorf, IA (US); Justin C. Freehill, Fenton, IL (US)

(73) Assignee: Deere & Company, Moline, IL (US)

( * ) Notice: Subject to any disclaimer, the term of this patent is extended or adjusted under 35 U.S.C. 154(b) by 56 days.

(21) Appl. No.: 12/840,585

(22) Filed: Jul. 21, 2010

(65) Prior Publication Data
US 2011/0070932 A1 Mar. 24, 2011

Related U.S. Application Data

(60) Provisional application No. 61/244,871, filed on Sep. 22, 2009.

(51) Int. Cl.
*A01F 12/40* (2006.01)

(52) U.S. Cl. .......................................... 460/112; 241/32
(58) Field of Classification Search .................. 460/112, 460/1, 6; 241/32; 56/504, 505
See application file for complete search history.

(56) References Cited

U.S. PATENT DOCUMENTS

| | | | | | |
|---|---|---|---|---|---|
| 2,842,175 | A | * | 7/1958 | Thompson | 241/243 |
| 6,120,373 | A | * | 9/2000 | Schrattenecker | 460/112 |
| 7,771,261 | B2 | * | 8/2010 | Schlesser et al. | 460/71 |
| 2008/0248843 | A1 | * | 10/2008 | Birrell et al. | 460/112 |
| 2008/0268928 | A1 | * | 10/2008 | Birrell et al. | 460/112 |
| 2008/0293462 | A1 | * | 11/2008 | Farley et al. | 460/112 |

* cited by examiner

*Primary Examiner* — Alicia Torres

(57) ABSTRACT

A chopper for an agricultural combine has blades with an overload release mechanism that permits them to pivot out of the way when the chopper is obstructed and experiences an overload condition.

12 Claims, 5 Drawing Sheets

COMBINE CHOPPER WITH OVERLOAD PROTECTION

CROSS REFERENCE TO RELATED APPLICATIONS

This is a non-provisional application based upon U.S. provisional patent application Ser. No. 61/244,871 entitled "Combine Chopper with Overload Protection", filed Sep. 22, 2009, which is incorporated herein by reference.

FIELD OF THE INVENTION

The invention relates to agricultural harvesters. More particularly it relates to cleaning elements for agricultural harvesters. Even more particularly it relates to attachments for agricultural harvesters for cleaning corn cobs.

BACKGROUND OF THE INVENTION

Agricultural combines are configured to travel through an agricultural field, cutting the crop plants loose from the field, and gathering them. They also strip the crop portion (e.g. the grain) from the rest of the crop plant and discard the unwanted portion (also known as "material other than grain" or "MOG").

Corn is harvested using an agricultural combine with a corn harvesting head or "corn head" attached on the front end thereof. The corn cobs are separated from the plant stalk itself, and are carried backwards into a threshing separating and cleaning system within the agricultural combine. In the combine the kernels of corn are separated from the corn cobs and are stored in a grain tank located in an upper portion of the agricultural combine.

The cobs of corn and corn husks are then transmitted to a chopper disposed at the lower rear portion of the agricultural combine where they are chopped into small pieces, approximately 2 to 6 cm long, and are ejected from outlet of the chopper at the rear of the combine and are spread over the ground.

In recent years, scientists have developed uses for the entire corn plant for such things as firing boilers or creating ethanol or making plastics. It is desirable therefore to collect not only the grain, but the corn cobs and the plant stalks.

In order to use this material, it must be collected. And in order to handle it easily, both the corn cobs and the cornstalks must be chopped into small pieces on the order of 3-9 cm long.

Collecting this additional stalk material, however, places a significant additional load on the chopper of a typical agricultural combine. The choppers were made to chop corn cobs, not to shop long stringy plant stalks as well. In newer arrangements, choppers for agricultural combines have been devised at shopping multiple directions laterally, in a direction parallel to the longitudinal axis of the chopper rotor, and radially, in a direction perpendicular to the axis of the chopper rotor.

One problem has surfaced with this new arrangement, however. By harvesting corn stalks as well as corn cobs, large solid matter, such as rocks, branches, and other material gets gathered together with the corn plant as it is processed in the agricultural combine.

When this material is transmitted through the chopper, it jams into the cutting spaces between the stationary and the moving chopper knives and damages the chopper.

The technical problem, therefore, is providing an overload mechanism for the chopper of an agricultural combine that will permit the stationary and the moving blades to move out of engagement with each other when they experience a high load, such as that provided by a rock, branch, or other unchoppable matter It is an object of this invention to provide such a combine chopper and agricultural combine.

SUMMARY OF THE INVENTION

In the description below, the terms "forward", "front", "ahead" "rear", "rearward", "behind" or other similar terms are defined in terms of the direction of travel of the agricultural combine in its straight line travel through an agricultural field during harvesting operations.

The terms "lateral", "transverse", "side-to-side" or other similar terms indicate a relative direction or orientation that is generally horizontal and perpendicular to the front-to-rear direction described in the previous paragraph.

In accordance with a first aspect of the Invention, a chopper for an agricultural combine is provided, comprising a rotor housing having an inlet for receiving crop residue and an outlet for transmitting chopped crop residue; a generally cylindrical rotor disposed inside the housing and having a plurality of blades extending therefrom that are spaced generally equiangularly in a circumferential direction and spaced generally equidistantly in an axial direction, said rotor being configured to rotate inside a housing; and stationary blades extending into the housing and disposed to interact with the blade on the rotor to chop crop residue; wherein the stationary blades are releasably held in an operating position by an overload release mechanism in which the blades interengage with the rotor blades such that the stationary blades will move out of the way of the rotor blades when a predetermined load threshold is reached.

The stationary blades may comprise a first plurality of blades disposed in spaced apart planes that are perpendicular to a rotational axis of the rotor that are spaced apart over substantially the entire length of the rotor.

The stationary blades may further comprise a second plurality of blades having working edges that extend generally parallel to the rotational axis and collinear with each other.

The stationary blades may be mounted to a plurality of blade holders that in turn are pivotally supported to pivot between an operating position in which the stationary blades and the rotor blades mutually engage to chop crop residue, to an overload position in which the blades of a blade holder are pivoted out of engagement with the corresponding rotor blades while other blade holders of the plurality of blade holders are still maintained in their operating positions.

The stationary blades may be removably fastened to their blade holders.

Each of the blade sections may have its own overload release mechanism.

The overload release mechanism for each of the blade holders may include a shear pin configured to shear when said each blade holder experiences a threshold load and to release the blade from its operating position.

Each of the plurality of blade holders may support at least one of the first plurality of blades and at least one of the second plurality of blades.

The blade holders may be disposed adjacent to each other and are sequentially disposed along the axial length of the rotor.

In accordance to a second aspect of the invention, an agricultural combine is provided comprising a chassis supported on wheels for travel through an agricultural field, and threshing, cleaning and separating apparatus disposed on the chassis for separating grain from crop residue, a grain tank on the chassis for storing the grain, a harvesting head supported on the chassis for severing the crop from the ground and conveying it to the threshing, cleaning and separating apparatus, the combine further comprising the chopper described above for receiving the crop residue and chopping it.

DESCRIPTION OF THE PREFERRED EMBODIMENTS

In the description below, like numbers refer to like elements in the various embodiments of the invention.

Figure 1:
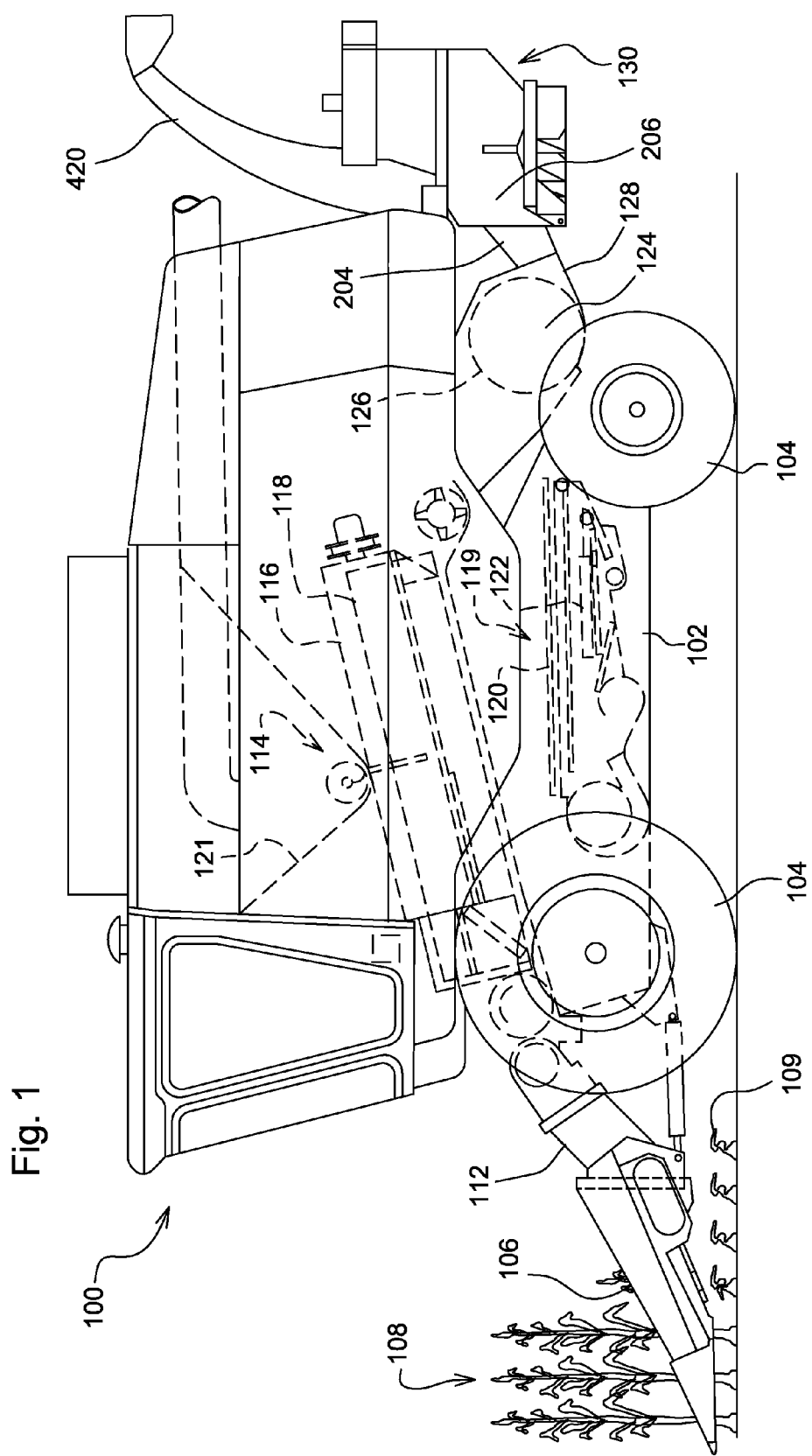
FIG. 1 is a side view of an agricultural combine with a chopper in accordance with the present invention.

FIG. 1 is a side view of an agricultural harvester in accordance with the present invention. In the arrangement shown in FIG. 1, an agricultural combine 100 has a chassis 102 supported by wheels 104 to carry the combine over the ground.

A harvesting head 106 is mounted on the front end of the combine to gather corn plants 108 growing in the agricultural field and strip the ears of corn from the plant stalks. The plant stalks 109, now stripped of their ears of corn, are left on the ground. The ears of corn are carried through the harvesting head 106 and rearward through a feederhouse 112 which supports the harvesting head on the combine. In an alternative arrangement, the plant stalks are severed from the ground and the entire plant is carried into the harvesting head for further processing.

Once the ears (or ears and stalks) pass through the feederhouse they go into a threshing cleaning and separating system. The threshing and separating system 114 includes a rotor 116 disposed inside a concave 118. The rotor rotates within the combine thereby threshing and separating the grain from the corn cobs and shucks (and stalks, if gathered). The grain falls downward into an oscillating cleaning shoe 119 which cleans the grain by passing it through a sieve 120 and chaffer 122, where the grain is collected and conveyed upward into a grain tank 121. Crop residue (typically including corn cobs and corn shucks, but which may also include corn stalks) passes rearward through the rotor and concave arrangement and is deposited in chopper 124 where it is chopped.

Chopper 124 includes a chopper rotor 126 with knives affixed thereto that rotates at high speed. The interaction of the rotor knives and stationary knives chops the crop residue (for example, corn cobs, stalks, and husks) into short pieces. Chopper rotor 126 also generates an airflow that carries the entrained chopped residue rearward through a chopper outlet 128.

In traditional combines, the chopped residue is then distributed over the ground by steering vanes or by rotating spreaders. In the illustrated arrangement, however, a chopped residue separator 130 is mounted to the rear of the combine in a position to receive the chopped residue from chopper outlet 128 and separate the chopped corn cobs (and stalks, if gathered) from the lighter portions of crop residue, such as corn husks. If the crop is separated into these two portions, the chopped residue separator then transmits the cobs (and stalks, if gathered) upward into chute 420 and thence into a vehicle (not shown) such as a cart or wagon that is disposed alongside the agricultural combine.

Figure 2:
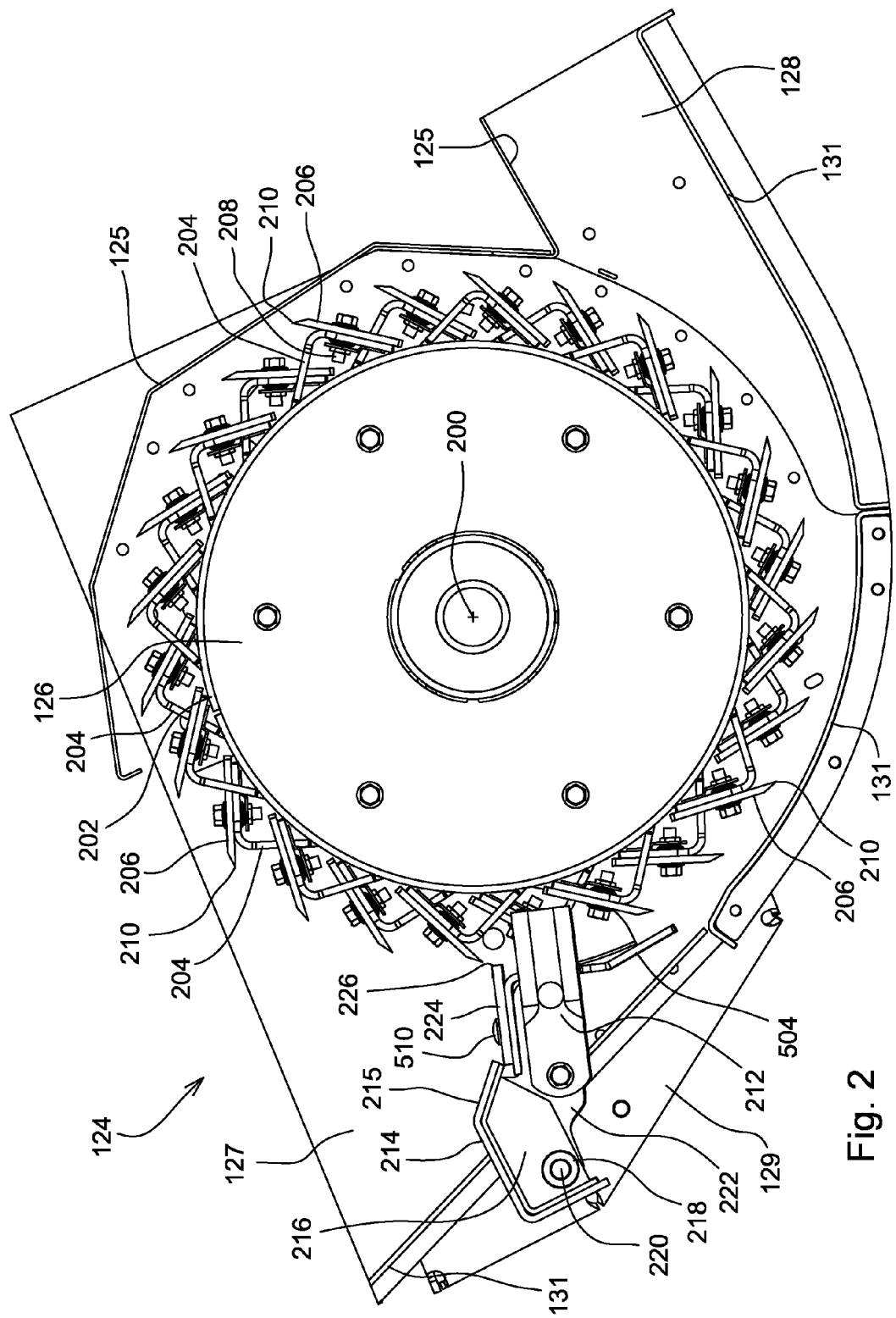
FIG. 2 is a detail view of the chopper of FIG. 1 with the left side plate of the chopper removed to show the rotor, the stationary blades and the blade holders for the stationary blades.
Figure 3:
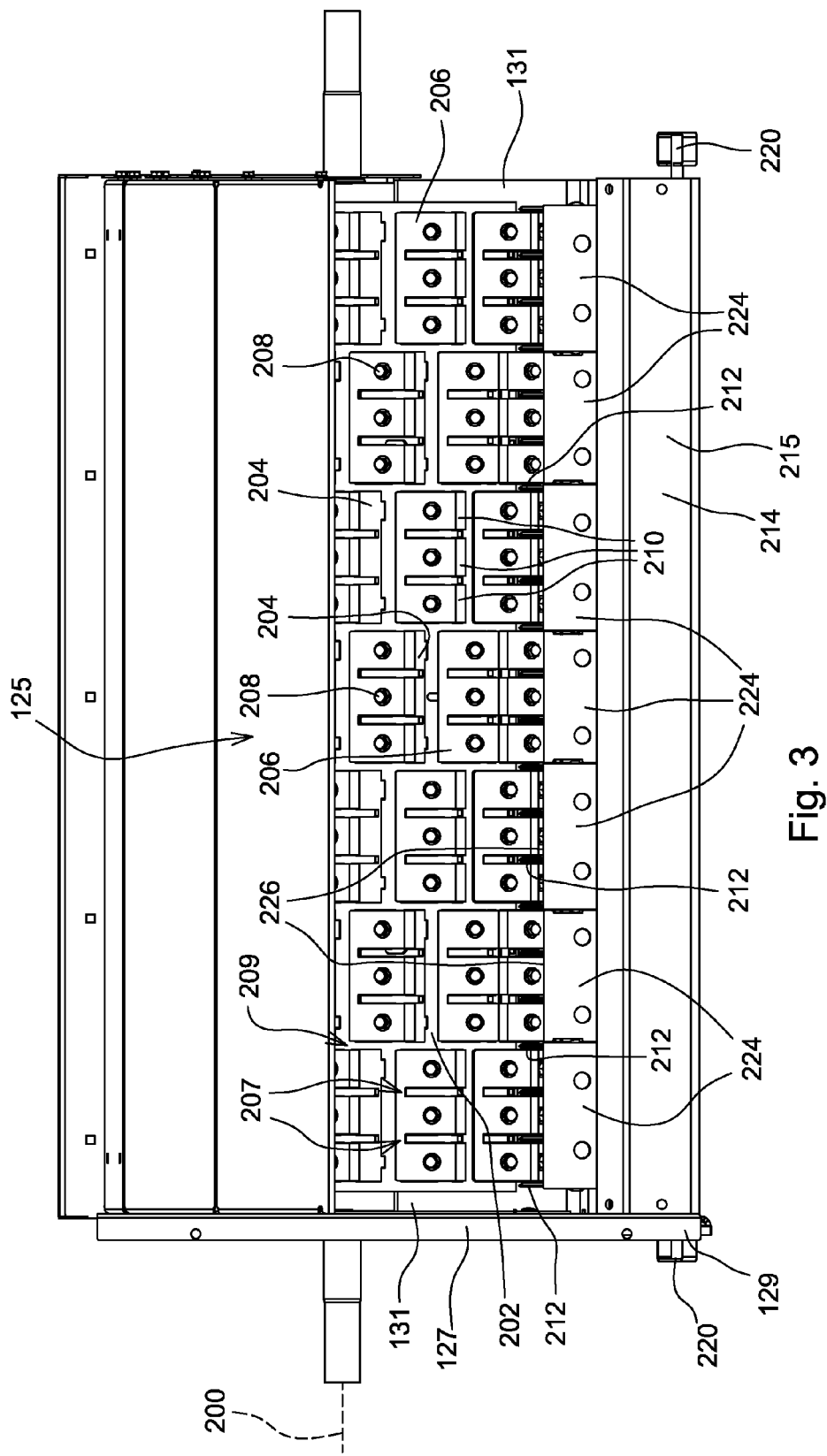
FIG. 3 is a top view of the chopper with the left side plate removed.

In FIGS. 2 and 3, which are now discussed, the left side plate of the chopper has been removed to show a side view of the chopper 124.

Chopper rotor 126 is supported for rotation on left and right side plates (only right side plate 127 is shown) for rotation about its longitudinal axis 200. The left side plate, removed in FIG. 2, is configured identically to right side plate 127, but in mirror relation.

Rotor 126 is disposed in a chopper housing that includes the left and right side plates 127, a curved upper sheet 125 that encloses the top of the rotor, extends between and is fixed to the two side plates, and extends from the inlet of the chopper to the outlet 128 of the chopper; and a curved lower sheet 131 that encloses the bottom of the rotor, extends between and is fixed to the two side plates, and extends from the inlet of the chopper to the outlet 128 of the chopper.

The left and right side plates of chopper 124 also include an adapter plate 129 (only the right adapter plate 129 is shown in FIG. 2) that are fixed to and support the left and right ends, respectively, of the transverse blade mount 214. The left adapter plate is identical to the right adapter plate but in mirror relation, and is similarly fixed to the left side plate.

Rotor 126 has a cylindrical outer skin 202 to which staggered V-shaped blade mounts 204 are attached, preferably by welding to extend apex outward. Blades 206 are bolted to the blade mounts 204 with bolts 208. Each of the blades 206 has a longitudinal cutting edge 210 that extends parallel to the longitudinal axis 200 of the rotor. Every cutting edge 210 is equidistant from rotor axis 200.

The blade mounts 204 are fixed to the outer skin 202 of the rotor 124 in seven rows along the length of the rotor. Each row of blade mounts 204 comprises 12 blade mounts 204 disposed equiangularly around the circumference of the rotor. Each row of blade mounts 204 is offset from its adjacent row by 15 degrees.

Each blade mount is configured to support a single blade 206. Each blade mount and its associated blade are provided with two aligned slots 207 that lie in a plane perpendicular to the rotational axis 200. These slots divide the blade mounts 204 and their blades 206 into three sections. The slots 207 extend substantially all the way to the surface of outer skin 202 of rotor 124, leaving a small web at the root of each blade and blade mount to hold the three sections of each together.

A space 209 is provided between each adjacent blade 206 and blade mount 204 to permit a stationary blade 212 to pass through without mechanically interfering with either the blades or the blade mounts whenever the rotor rotates.

Transverse blade mount 214 comprises an elongate member 215 that extends generally parallel to the rotational axis 200 of the rotor and is substantially as long as the rotor.

Transverse blade mount 214 is fixed to the end walls of the chopper that are disposed perpendicular to the rotational axis of rotor 124 and also support rotor 124.

Transverse blade mount 214 comprises a plurality of spaced apart struts 216 (FIG. 2) that lie in a plane perpendicular to rotational axis 200 and are welded to the underside of elongate member 215. A cylindrical sleeve 218 is welded to each strut 216 to provide a support for pin 220. Cylindrical sleeves 218 share a common longitudinal axis. Pin 220 extends substantially the entire width of the chopper and provides a common support for seven blade holders 222.

Pin 220 can be progressively inserted from outside chopper 124 such that it sequentially passes through each cylindrical sleeve 218. In this manner, the operator can sequentially attach one blade holder 222 after another on pin 220 and transverse blade mount 214.

Each blade holder 222 supports a plurality of stationary blades 212. Each blade holder 222 also supports a second blade 224 that has a working (i.e. shearing) edge 226. Working edges 226 extend parallel to rotational axis 200.

Each working edge 226 lies on a line that extends across the width of chopper 124. This line is also parallel to the rotational axis 200 of rotor 124. Second blades 224 are secured to their respective blade holders 222 with two removable fasteners 226.

Working edges 226 are stationary during operation. They engage the longitudinal cutting edges 210 of each of blades 206 mounted on rotor 126.

As rotor 124 in FIGS. 2,3 rotates, working edges 226 of second blades 224 successively shear against edges 210 of blades 206. They do not mechanically interfere with the each other, but pass within millimeters of each other, close enough to shear the crop residue, but not to contact each other.

The gap at closest approach between the two blades when harvesting corn is preferably set to between 1 and 6 millimeters. The edges of stationary blades 212 similarly shear against the edges of slots 207 in blades 206 and blade mounts 204 and have a similar spacing.

This arrangement of blades provides bidirectional cutting of crop residue. A first cut along a shearing line defined by working edges 226, and a twenty-two second cuts (by the twenty-two stationary blades 212) in a transverse direction.

If a long corn stalk arrives at the chopper in a direction generally parallel to the axis of rotation 200 it will be sheared into up to 22 sections, each section being approximately 5-8 cm long. This length is established by the spacing between adjacent stationary blades 212 in a direction parallel to the rotational axis 200.

If the same cornstalk arrives at the chopper oriented perpendicular to the rotational axis 200, it will be chopped into successive short sections by edges 210 of a single row of 12 blades.

A corn stalk arriving at an intermediate angle will be chopped by a combination of blades 206, 212 and 224.

Figure 4:
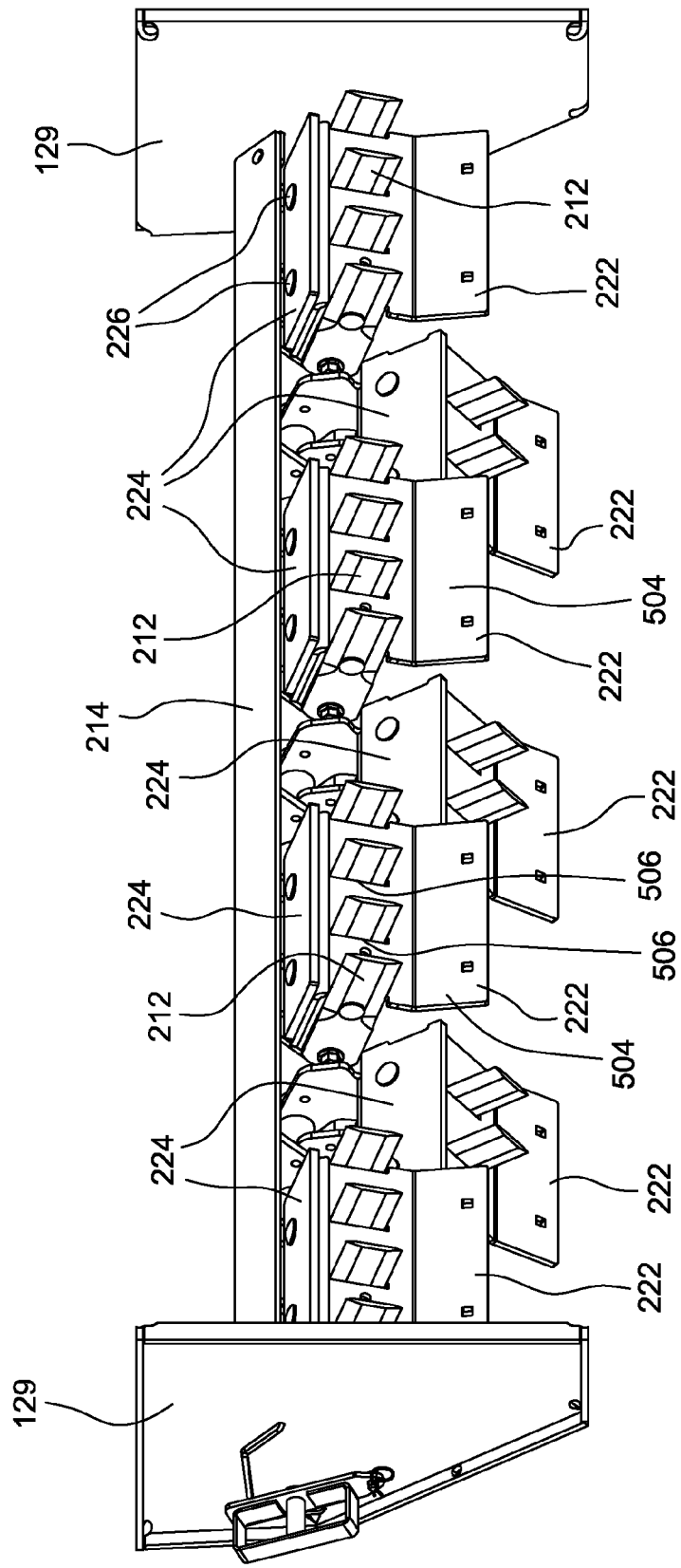
FIG. 4 is a rear perspective view of the blade holders on the transverse blade mount with some blade holders in their operating positions and some in their overload positions.

In FIG. 4, three of the seven blade holders 222 are shown in an overload position, pivoted out of the way about pin 220 into the position they would be in when they have experienced an excessive load on their blades.

Any of the seven blade holders can be placed in this downwardly pivoted overload position should they experience and overload condition. For convenience of explanation, however, only three are shown in this position.

There are two configurations of blade holders 222 shown in the present application. One configuration of blade holder 222 (i.e. the three blade holders shown in their overload positions in FIG. 4) supports two stationary blades 212. The other configuration of blade holder 222 (i.e. the four blade holders shown in their operating positions in FIG. 4) supports four stationary blades 212.

Figure 5:
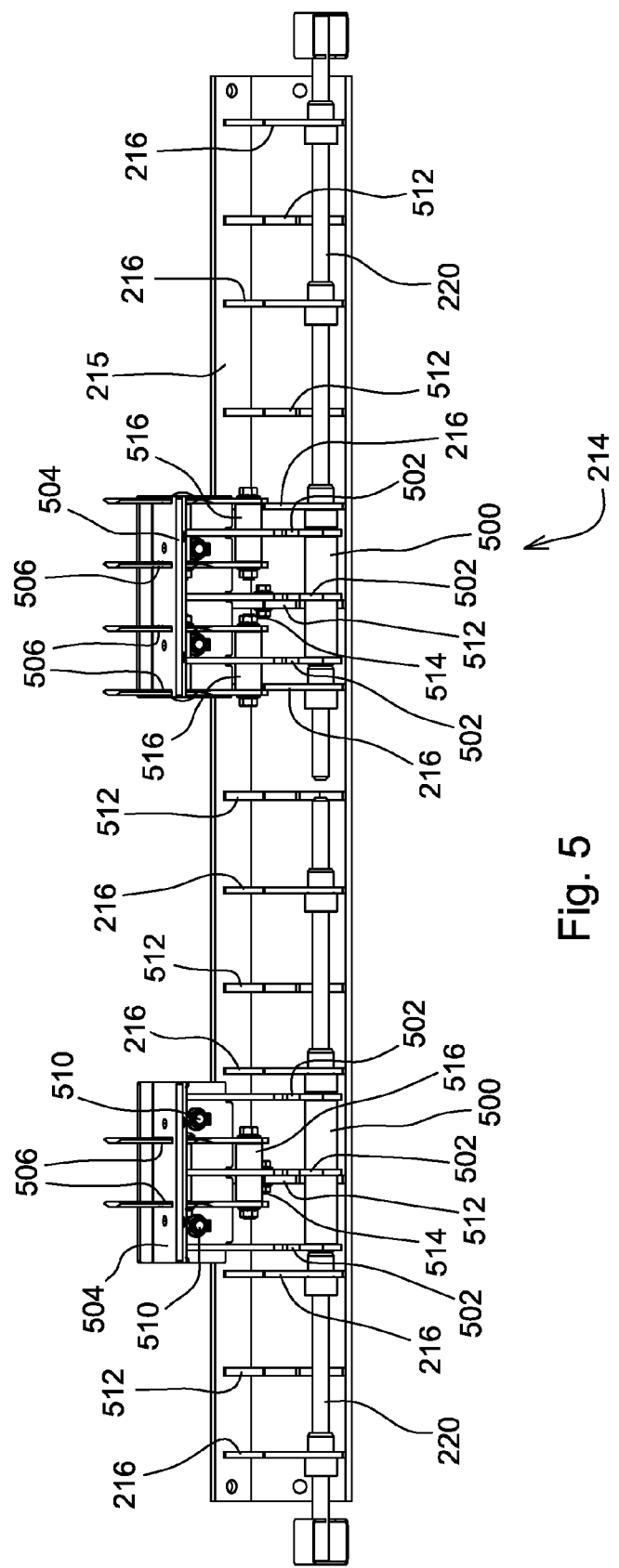
FIG. 5 is a bottom view of the transverse blade mount of FIG. 3, with five of the seven blade holders removed and the two remaining holders disposed in their operating positions.

FIG. 5 shows two blade holders 222 (one of each type) fixed to the transverse blade mount 214. Elongate member 215 has eight struts 216 fixed thereto, with each strut 216 supporting a cylindrical sleeve 218. The struts are preferably welded to the elongate member and the cylindrical sleeves are welded to their corresponding struts. Struts 216 are generally flat, each lying in a plane that is perpendicular to the rotor axis of rotation 200.

Each blade holder 222 includes a bushing 500 that is mounted for pivotal movement on pin 220. Each bushing 500 is fixed to three struts 502 that are flat and lie in a plane that is perpendicular to the rotor axis of rotation 200.

Struts 502 are fixed (preferably welded) to an L-shaped blade support 504. Blade support 504 has slots 506 therethrough that support and guide blades 212. Blade support 504 also has a generally flat top surface 508 (FIG. 6) that is disposed in a plane that is generally parallel to axis of rotation 200. Blade 224 is fixed to surface 508 with removable fasteners 510.

Release members 512 are fixed to elongate member 215 at intervals along its length preferably by welding. Release members 512 are flat members lying in a plane that is perpendicular to rotational axis 200. Each of release members 512 has an aperture for receiving and supporting a shear pin 514. Shear pin 514 extends through the aperture in release member 512 and into a mating hole in the middle strut 502 on each blade holder 222. It is secured therein with a snap ring or threaded end portion. Shear pin 514 is coaxial to axis of rotation 200.

Each of blades 212 has an aperture at one end by which it is removably fixed to its corresponding blade holder 222. Each blade holder has either one or two bushings 516 that are fixed to struts 502. These bushings receive and support a removable fastener (here shown as a pin with snap ring, although it could also be a threaded fastener) that passes through the aperture in the blade 212 and thereby prevent the blade 212 from sliding through the slot 506.

Release members 512, shear pins 514, and struts 502 comprise an overload release mechanism.

When the chopper experiences and obstruction that prevents stationary blades 212 or 224 from passing adjacent to blades 206 on rotor 126, a large force is applied to the blades that are obstructed. This force is transferred to the blade holder that holds the stationary blades in question. Should this force reach a designed threshold level, it shears shear pin 514 in two pieces. Shear pin 514 is the only element holding the blade holder in its operating position. Once shear pin 514 has been cut, the obstructing material that is being driven by the rotor into the blade holder 222 pushes the blade holder 22 downward. This causes the blade holder 222 to pivot about pivot pin 220 on its bushing 500 until it is in it overload position. See for example, the three blade holders 222 shown in their overload positions in FIG. 4.

The foregoing arrangement has several advantages. By dividing the blades into multiple sections disposed adjacent to each other and extending along the length of the rotor the rotor can continue to operate if a single section is overloaded and swings out of the way.

A single blade holder might be used in place of the multiple (preferably seven as shown herein) blade holders, causing all the stationary blades to simultaneously move to their overload position when an obstruction becomes jammed in the chopper anywhere. This would have the disadvantage of completely disabling the chopper when any overload condition is experienced. Additional blade holders might be provided in excess of the seven blade holders shown herein, up to a total of 15 or even 20, but the added cost may not justify them.

As another alternative arrangement, the longitudinally extending blades 224 may be replaced with a single elongate blade extending the width of the chopper and this blade may be provided with its own overload release mechanism. The axially extending stationary blades 212 may similarly be mounted together and provided with their own release mechanism. In this way blades 212 and blades 224 would have their own individual release mechanisms. These unitary assemblies of blades 212 (although not their release mechanisms) already exist in combine choppers. While this arrangement would make manufacturing easier, it would be of limited value, since any obstruction that causes blades 212 and 206 to block each other would likely also cause blades 224 and 206 to block each other as well. Thus any obstruction would likely require both sets of blades to be release and pivot to their overload positions.

In yet another alternative arrangement, pivot pin 220 can be provided in a plurality of pivot pin sections. For example two sections, in which one extends inward from the left side of the chopper to the transverse middle of the rotor and one extends inward from the right side of the chopper to the transverse middle of the rotor. In his manner, the operator could extract a pivot pin 220 from either side of the chopper and each pivot pin would have half as hard to withdraw as a single long pivot pin 220 would be to withdraw.

As yet another alternative arrangement, each knife section may be supported on its own individual pivot pin 220. In this case any damage to the pivot pin due to an overload could be more easily repaired and replaced with a single short section of pivot pin 220.

Having described the preferred embodiment, it will become apparent that various modifications can be made without departing from the scope of the invention as defined in the accompanying claims.

The invention claimed is:

1. A chopper for an agricultural combine comprising:
a rotor housing having an inlet for receiving crop residue and an outlet for transmitting chopped crop residue;
a generally cylindrical rotor disposed inside the housing and having a plurality of blades extending therefrom that are spaced generally equianqularly in a circumferential direction and spaced generally equidistantly in an axial direction, said rotor being configured to rotate inside the housing; and
stationary blades extending into the housing and disposed to interact with the blade on the rotor to chop crop residue;
wherein the stationary blades are releasably held in an operating position by an overload release mechanism in which the blades interengage with the rotor blades such that the stationary blades will move out of the way of the rotor blades when a predetermined load threshold is reached; wherein the stationary blades comprise a first plurality of blades disposed in spaced apart planes that are perpendicular to a rotational axis of the rotor that are spaced apart over substantially the entire length of the rotor; wherein the stationary blades further comprise a second plurality of blades having working edges that extend generally parallel to the rotational axis and collinear with each other; wherein the stationary blades are mounted to a plurality of blade holders that in turn are pivotally supported to pivot between an operating position in which the stationary blades and the rotor blades mutually engage to chop crop residue, to an overload position in which the blades of a blade holder are pivoted out of engagement with the corresponding rotor blades while other blade holders of the plurality of blade holders are still maintained in their operating positions.

2. The chopper of claim 1, wherein the stationary blades are removably fastened to their blade holders.

3. The chopper of claim 1, wherein each of the blade sections has its own overload release mechanism.

4. The chopper of claim 1, wherein the overload release mechanism for each of the blade holders includes a shear pin configured to shear when said each blade holder experiences a threshold load and to release the blade from its operating position.

5. The chopper of claim 1, wherein the blade holders are disposed adjacent to each other and are sequentially disposed along the axial length of the rotor.

6. An agricultural combine comprising a chassis supported on wheels for travel through an agricultural field, and threshing, cleaning and separating apparatus disposed on the chassis for separating grain from crop residue, a grain tank on the chassis for storing the grain, a harvesting head supported on the chassis for severing the crop from the ground and conveying it to the threshing, cleaning and separating apparatus, and a chopper for receiving the crop residue and chopping it, the chopper further comprising:
a rotor housing having an inlet for receiving crop residue and an outlet for transmitting chopped crop residue;
a generally cylindrical rotor disposed inside the housing and having a plurality of blades extending therefrom that are spaced generally equiangularly in a circumferential direction and spaced generally equidistantly in an axial direction, said rotor being configured to rotate inside the housing ; and
stationary blades extending into the housing and disposed to interact with the blade on the rotor to chop crop residue;
wherein the stationary blades are releasably held in an operating position by an overload release mechanism in which the blades interengage with the rotor blades such that the stationary blades will move out of the way of the rotor blades when a predetermined load threshold is reached; wherein the stationary blades comprise a first plurality of blades disposed in spaced apart planes that are perpendicular to a rotational axis of the rotor that are spaced apart over substantially the entire length of the rotor; wherein the stationary blades further comprise a second plurality of blades having working edges that extend generally parallel to the rotational axis and collinear with each other; wherein the stationary blades are mounted to a plurality of blade holders that in turn are pivotally supported to pivot between an operating position in which the stationary blades and the rotor blades mutually engage to chop crop residue, to an overload position in which the blades of a blade holder are pivoted out of engagement with the corresponding rotor blades while other blade holders of the plurality of blade holders are still maintained in their operating positions.

7. The combine of claim 6, wherein the stationary blades are removably fastened to their blade holders.

8. The combine of claim 6, wherein each of the blade sections has its own overload release mechanism.

9. The combine of claim 6, wherein the overload release mechanism for each of the blade holders includes a shear pin configured to shear when said each blade holder experiences a threshold load and to release the blade from its operating position.

10. The combine of claim 6, wherein each of the plurality of blade holders supports at least one of the first plurality of blades and at least one of the second plurality of blades.

11. The combine of claim 6, wherein the blade holders are disposed adjacent to each other and are sequentially disposed along the axial length of the rotor.

12. The chopper of claim 1, wherein each of the plurality of blade holders supports at least one of the first plurality of blades and at least one of the second plurality of blades.

* * * * *